United States Patent
Okuyama et al.

(10) Patent No.: US 6,707,633 B2
(45) Date of Patent: Mar. 16, 2004

(54) MAGNETIC DISK DEVICE INCLUDING COARSE AND MICRO ACTUATORS

(75) Inventors: Atsushi Okuyama, Chiyoda (JP); Masaki Odai, Chiyoda (JP); Hidehiko Numasato, Odawara (JP); Shigeo Nakamura, Odawara (JP); Masahito Kobayashi, Ushiku (JP)

(73) Assignee: Hitachi, Ltd., Tokyo (JP)

( * ) Notice: Subject to any disclaimer, the term of this patent is extended or adjusted under 35 U.S.C. 154(b) by 321 days.

(21) Appl. No.: 09/791,726

(22) Filed: Feb. 26, 2001

(65) Prior Publication Data

US 2001/0005295 A1 Jun. 28, 2001

(51) Int. Cl.[7] .......................... G11B 21/02; G11B 5/596
(52) U.S. Cl. .................... 360/75; 360/77.02; 360/78.05
(58) Field of Search ................................. 360/77.08, 61, 360/63, 62, 78.12, 78.05, 75, 77.02

(56) References Cited

U.S. PATENT DOCUMENTS 6,160,676 A * 12/2000 Takaishi .................. 360/78.05
6,437,937 B1 * 8/2002 Guo et al. ................ 360/78.05
2002/0154436 A1 * 10/2002 Goodman et al. ............ 360/75

OTHER PUBLICATIONS

JP-A-4-368676.
"2000 Asia–Pacific Magnetic Recording Conference, Digest of APMRC 2000 On Mechanical and Manufacturing Aspects of HDD, SRC" WA3–01/02.

* cited by examiner

Primary Examiner—Andrew L. Sniezek
(74) Attorney, Agent, or Firm—Antonelli, Terry, Stout & Kraus, LLP

(57) ABSTRACT

A magnetic disk device comprises at least a disk having information, at least a head for reading or writing information from or into the disk, at least a micro actuator for supporting the head and positioning the head, a coarse actuator for carrying the micro actuator and positioning the head, a controller for controlling the micro actuator and the coarse actuator based on the servo information read by the head, and a host controller for determining that information is to be read. In the case where the host controller determines that the operation is in a wait mode, the positioning operation of the micro actuator is stopped.

6 Claims, 6 Drawing Sheets

MAGNETIC DISK DEVICE INCLUDING COARSE AND MICRO ACTUATORS

BACKGROUND OF THE INVENTION

The present invention relates to a magnetic disk device, or in particular to a magnetic disk device comprising a magnetic head support mechanism including a coarse actuator and a micro actuator.

In the conventional magnetic disk device, an actuator having only a voice coil motor (VCM) mounted thereon is used as a means for driving the head. With the recording density of the magnetic disk device ever on the increase, it has been desired to improve the head positioning accuracy to reduce the track pitches. For this purpose, the servo band of the head positioning control system is required to be improved to at least 1 kHz. It has become difficult, however, to realize the servo band of 1 kHz or more with the conventional system for driving the head only with the VCM due to the effect of the resonance mode of the actuator.

In view of this, JP-A-4-368676 proposes the use of a dual-stage actuator, for example, including a coarse actuator and a micro actuator for inching the head as a means for driving the VCM.

Generally, with the magnetic disk device, the waiting (idle mode) time for performing the operation of following the track without any instruction from a host system is overwhelmingly longer than the execution time for performing the recording/reproducing operation or the operation of accessing a track (seek operation) in response to an instruction from the host system. The coarse actuator and the fine actuator continued in operation to perform the following operation in idle mode poses the problem of a shortened service life of the micro actuator. The relation between the service life of a piezo actuator used as a micro actuator and the operation time is described, for example, in "Study on Lifetime Prediction Method for Piggyback PZT Actuator, 2000 Asia-Pacific Magnetic Recording Conference, WA3-01/02, 2000" by Nakamura, et al.

SUMMARY OF THE INVENTION

The present invention has been developed in view of the problem described above, and the object thereof is to improve the service life of the micro actuator by stopping the feedback control operation of the micro actuator and thus reducing the operation time of the micro actuator as far as possible in idle mode in the absence of a data access command from the host system and thereby to provide a reliable magnetic disk device.

Another object of the present invention is to provide a magnetic disk device which can perform the operation of quick restoration from the inactive state of the micro actuator.

In order to achieve the objects described above, according to the present invention, there is provided a magnetic disk device comprising a micro actuator for supporting a head to read or write information from or into a disk and performing a micro positioning operation, a coarse actuator for positioning the head by coarsely moving the support mechanism carrying the micro actuator, a control means for controlling the micro actuator and the coarse actuator based on the servo information read by the head and a host controller for giving an command to read or write information, wherein the positioning operation of the micro actuator is stopped in the case where the host controller determines that the operation is in idle mode.

DESCRIPTION OF THE EMBODIMENTS

A first embodiment of the invention will be explained below with reference to the accompanying drawings.

Figure 1:
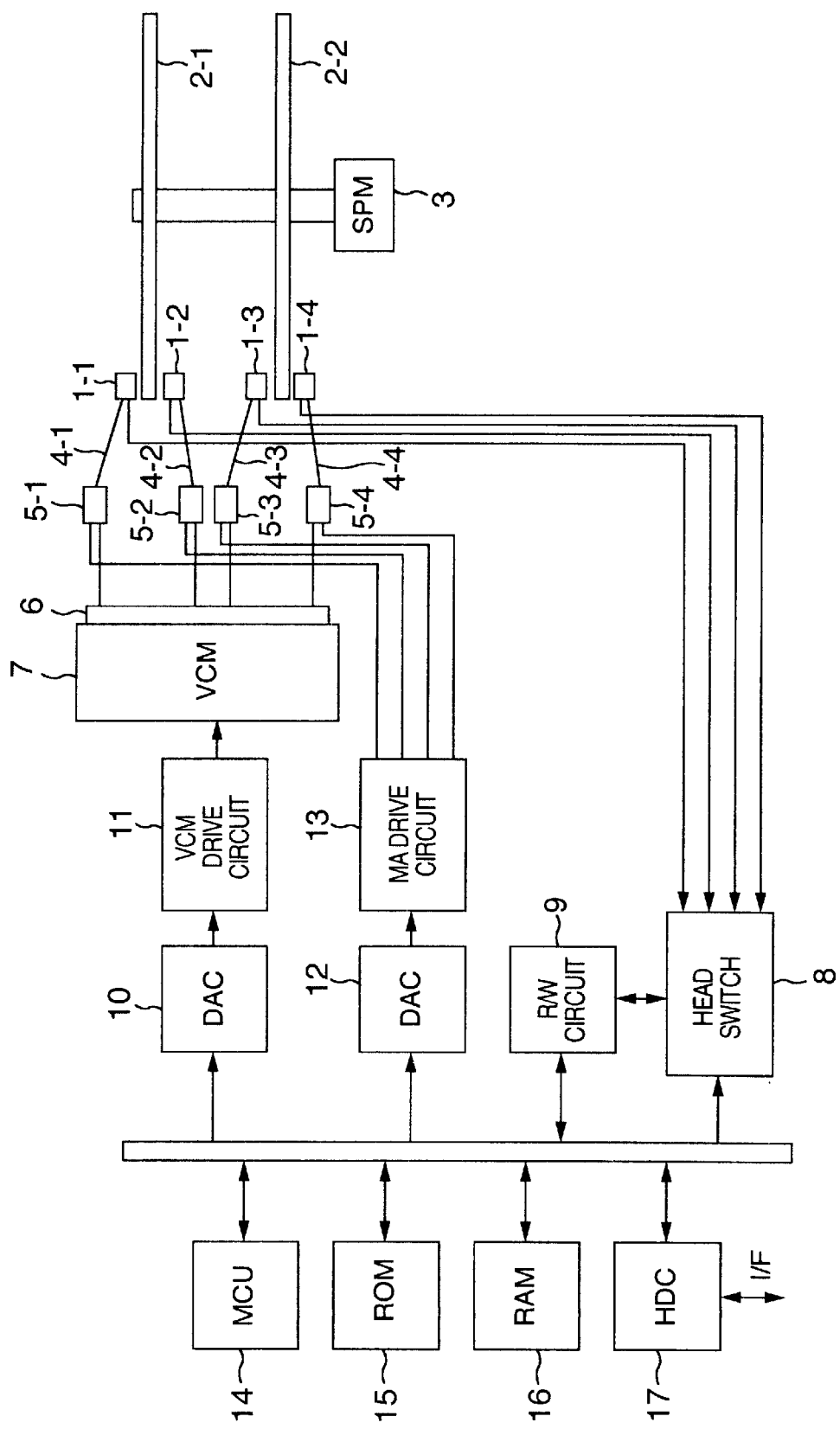
FIG. 1 shows a hardware configuration of a magnetic disk device according to an embodiment of the invention.

FIG. 1 shows a hardware configuration of a magnetic disk device according to an embodiment of the invention. A plurality of disks 2 (two magnetic disk 2-1 to 2-2 according to this embodiment) are mounted on a spindle motor (SPM 3). Each track (not shown) of the disks 2 (2-1 and 2-2) has a servo area for recording servo information and a data area for recording data. The disks 2 can record information on both sides thereof, and for this purpose, include heads 1-1 to 1-4. The heads 1-1 to 1-4 are respectively supported on suspensions 4-1 to 4-4, which include micro actuators (hereinafter referred to as the MA) 5-1 to 5-4 for inching the head. The suspensions 4-1 to 4-4 are fixed on a carriage 6, which in turn is mounted on a voice coil motor 7 (hereinafter referred to as the VCM) providing a coarse actuator. The VCM 7 coarsely drives the carriage 6, while the MAs 5 (5-1 to 5-4) drive the suspensions 4 (1-4 to 4-4). A head switch 8 switches the read signal for the heads 1-1 to 1-4 for reading/writing information in response to an command from the host controller designating a head for reading/writing information. The suspension unit including the micro actuators described above is sometimes called a head support mechanism.

A read/write circuit (hereinafter referred to as the R/W circuit) 9 demodulates the read signal from the output of the heads 1-1 to 1-4 and supplies a write signal to the heads 1-1 to 1-4. The R/W circuit 9 has a position detecting circuit for detecting the head position from the servo information. A micro controller unit (MCU) 14 is configured with a processor and controls the actuators. A read-only memory (ROM) 15 stores a program executed by the MCU 14. An operating system or the like is stored in a hard disk controller (HDC) 17 and a random access memory (RAM) 16 which also have a recording area for the user. The HDC 17, which is called also a host controller, acts as an interface with a host system (not shown) and selects the head or issues a seek command in compliance with a R/W (read/write) request from the host system. The RAM 16 stores the data to be supplied to or received from the host system. The VCM 7 is driven and the operation thereof is controlled by a VCM drive circuit 11, and the MAs 5 are controlled by a MA drive circuit 13. The digital signal from the HDC, etc. is converted into an analog signal by D/A converters (DAC) 10, 12 of the VCM drive circuit and the MA drive circuit.

Figure 2:
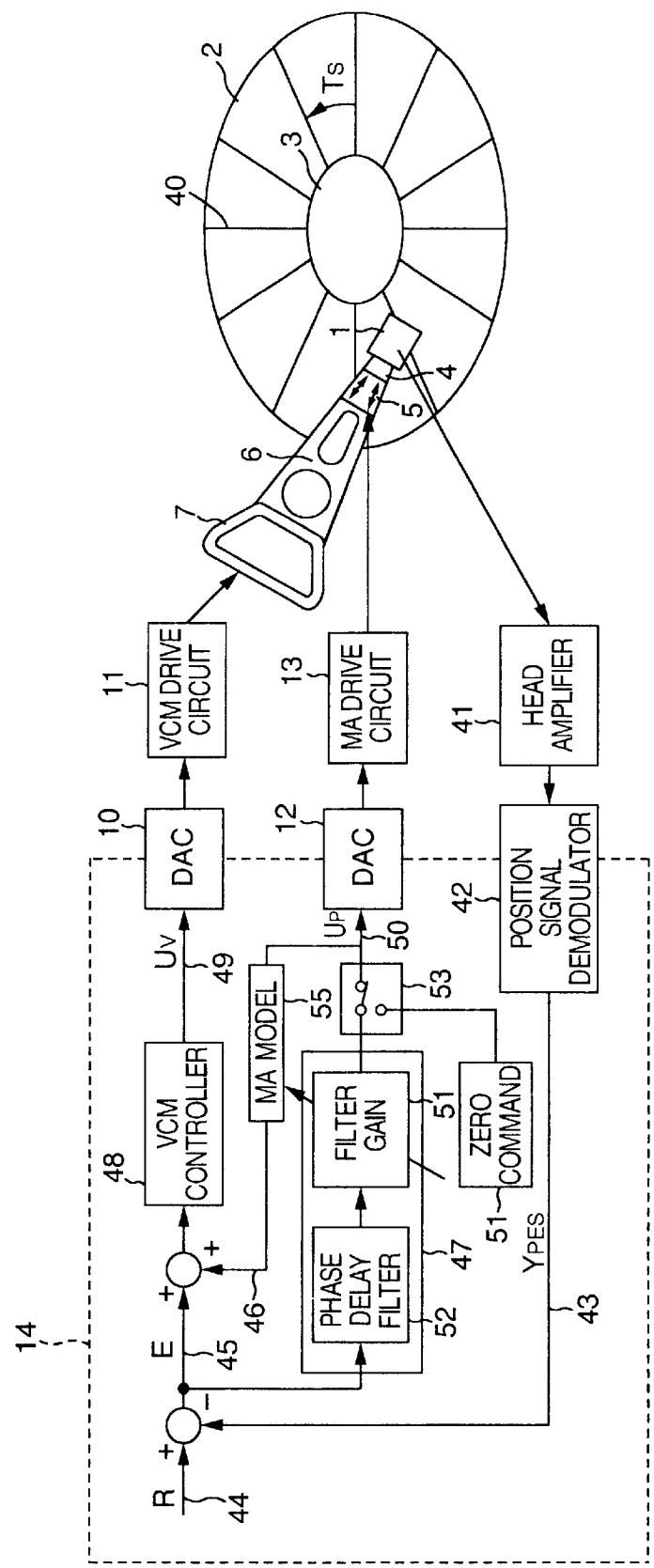
FIG. 2 is a block diagram showing a magnetic disk device according to an embodiment of the invention.

Now, the configuration of the invention will be explained in more detail with reference to the block diagram of FIG. 2. The magnetic disk 2 is rotated at a constant high speed by a spindle motor 3. Position information 40 is recorded in advance at the head of a track sector of the magnetic disk 2. The magnetic head 1 reads or writes data from or into the disk 2 in opposed relation thereto. The magnetic head 1 is supported by the suspension 4. An end of a piezo element 5 is fixed on the suspension 4, and the other end of the piezo element 5 is supported on the carriage 6. By driving the piezo element 5, the suspension 4 is moved thereby to set the head finely in position. The explanation with reference to FIG. 2 assumes that each micro actuator (MA) is configured of a piezo element. When one end of the piezo element 5 extends and the other end thereof contracts, the head 1 moves in the direction perpendicular to rotation direction of the disk. The carriage 6 is mounted integrally on the rotor side of the motor 7 (VCM) and thus driven. As the result of driving the voice coil motor 7, the carriage 6 is moved from the outer periphery toward the inner periphery of the disk 2 or the other way around about a pivotal shaft.

Position information 40 is recorded beforehand in the disk 2 at time intervals of Ts. The position information 40 thus recorded contains a marker section indicating the head of a sector, a pull-in section for AGC (automatic gain control), a track number and a burst signal for detecting relative positions. The head 1 reads the position information recorded in the disk surface and detects an error between the head and the position information at regular time intervals of Ts. The resulting error signal is amplified by a head amplifier 41, and a head position error signal YPES 43 is generated by a position signal demodulation circuit 42. The position signal is compared with a target position track R44, and the operating amount 50 of the micro actuator is calculated by the controller 47 of the micro actuator (MA). In the normal following control operation, the target position track R is set to 0. The micro actuator has a mechanical resonance at a high frequency of about 10 kHz. The controller 47 of the micro actuator, if provided with the integration characteristic, can operate the micro actuator in stable fashion.

As an example, the controller 47 of the micro actuator constitutes a compensator of the control system including a phase delay filter 52 and a filter gain 51. In view of the fact that the output of the micro actuator cannot be observed directly, the position thereof is estimated by an observer 55 using a model of micro actuator. The model from the input signal to the output signal of the micro actuator using a piezo element can be approximated as a gain thereof. As a result, a signal 46 which is the product of the output of the micro controller and the gain of the micro actuator is regarded as an output of the micro actuator, and added to the error signal 45 for the coarse actuator. The coarse (VCM) controller 48, even after the error signal thereof is reduced to zero by the micro actuator, continues to be controlled by feedback so as to reduce the displacement of the micro actuator. At the same time, the micro controller is also activated. While the head position error signal 43 is held at the target position, therefore, the output of the micro actuator is reduced soon to such an extent that the micro actuator can be held at zero, i.e. the central position of the movable range. The operation amounts UP50, UV49 are converted from digital amounts to analog amounts in the D/A converters 12, 10, respectively. The resulting signals are sent out to a MA drive amplifier circuit 13 and a VCM drive amplifier circuit 11, respectively, thereby to drive the piezo element 5 and the voice coil motor 7, respectively. Numeral 14 designates a micro controller unit.

Figure 3:
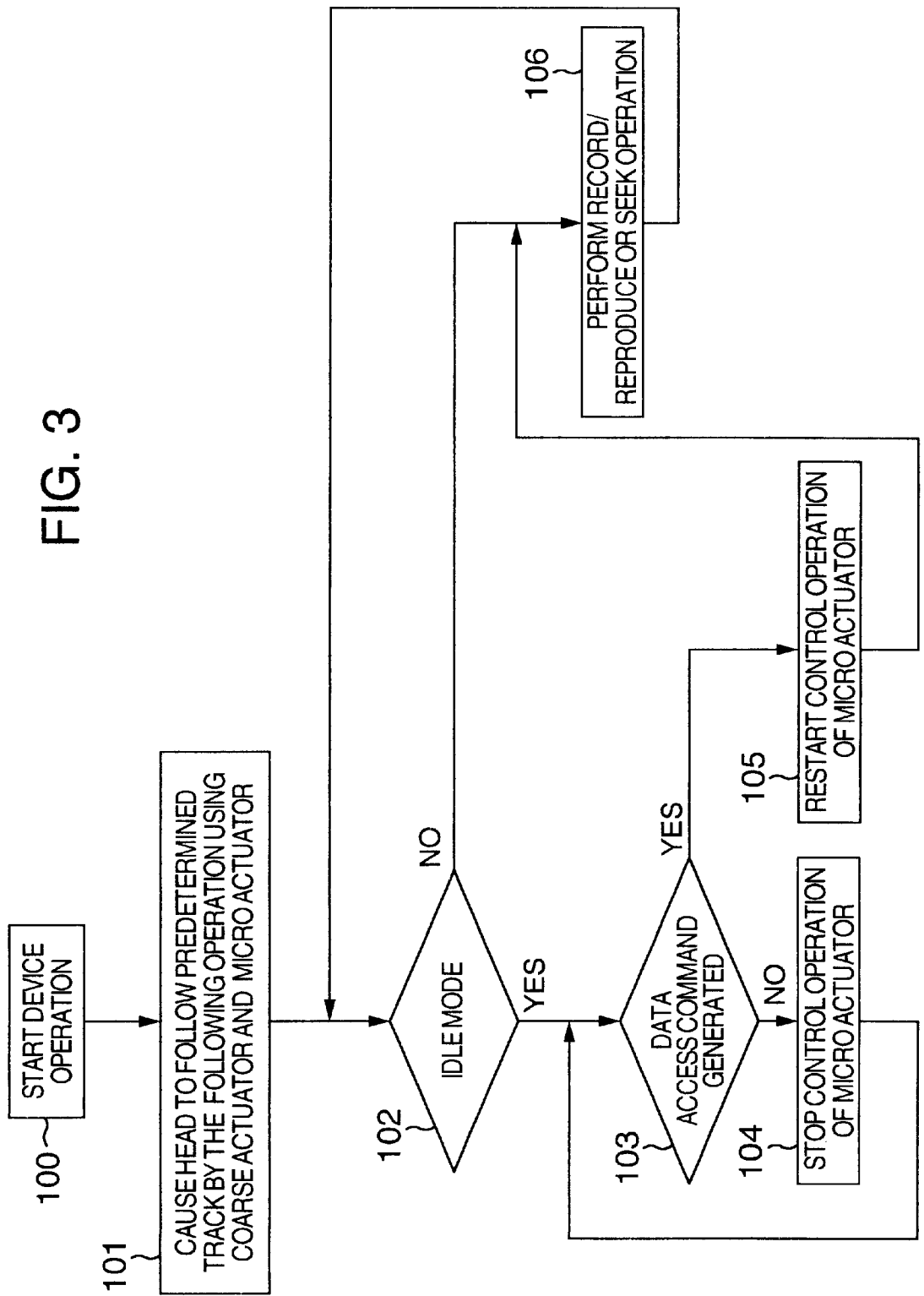
FIG. 3 is a flowchart showing the operation of the invention.

With reference to FIG. 3, the operation of the invention will be described. FIG. 3 is a flowchart showing a method of starting, stopping and restarting the head positioning control operation according to this invention. After activation of the magnetic disk device (step 100), the MCU 14 reads from the position detection circuit of the R/W circuit 9 the position of the head to be controlled. Then, based on this head position, the MCU 14 calculates and outputs the drive values of the MAs 5-1 to 5-4 and the VCM 7 corresponding to the respective heads. In this way, each head is caused to follow a predetermined track (step 101) by the following operation using the coarse actuator and the micro actuator. In the case where the data access command is not issued from the HDC 17 for a predetermined length of time (step 103), the MCU 14 stops the control operation for the micro actuator (step 104). Under this condition, the issuance of a data access command from the HDC 17 is awaited (step 103). Upon receipt of a data access command from the HDC 17, the MCU 14 restarts the control operation for the micro actuator (step 105). Thus, the MCU 14 carries out the record/reproduce operation or the seek operation.

In this configuration, assume that a wait mode is generated in the absence of a data access command from the host system. The feedback control operation of the micro actuator is stopped, and the operation time of the micro actuator is reduced as far as possible. Thus, the service life of the micro actuator can be improved. Further, a magnetic disk device high in reliability can be provided.

The positioning operation of the micro actuator 5 can be stopped by continuing to maintain at zero or supply a constant voltage as an output of the MA drive circuit 13 for driving the micro actuator. In the case under consideration, the MA controller 47 is assumed to execute the arithmetic operation based on the error signal 45 while at the same time outputting and sending out the operation amount 50 and the signal 46 of zero or a constant value actually to the DAC 12. As a result, the filter of the MA controller 47 is kept updated to a new value, and in the case where an command to restart the control operation for the micro actuator is issued (step 105), the positioning operation can be carried out quickly. In this case, the positioning control operation of the head 1 is performed only with the VCM controller, and the head cannot be set in position at a target track with high accuracy for reading or writing information, although it is possible to position the head in the neighborhood of the target track in stable fashion. Normally, the accuracy of positioning only with the VCM is lower at most 1.5 times to twice than the positioning accuracy involving the MA.

The positioning operation of the micro actuator 5 can also be stopped by suspending the operation of the MA drive circuit 13 for driving the micro actuator. Deactivating the MA drive circuit also contributes to the reduction in the power consumption of the circuit.

In the case where an operation wait mode occurs in the absence of a data access command from the host system, on the other hand, the control band of the MA controller 47 of the micro actuator can be reduced. This can be accomplished either by adjusting the gain of the controller 47 of the micro actuator or by changing the crossover frequency of the compensator. As still another alternative, the frequency characteristic of the compensator of the micro actuator is changed by taking into consideration the frequency band of the oscillation synchronous with the disk rotation that has been mainly followed in the micro actuator. For example, only the gain of the compensator in the low-frequency band can be changed by changing the crossover frequency of the compensator. A change in gain reduces the ability to follow the oscillation synchronous with the disk rotation in the micro control system. Nevertheless, the operation of the micro actuator can be suppressed correspondingly, and therefore the service life of the micro actuator is improved. Further, the following operation can be quickly restored when restarting the control operation for the micro actuator. As a result, a magnetic disk device having a high reliability can be provided.

Figure 4:
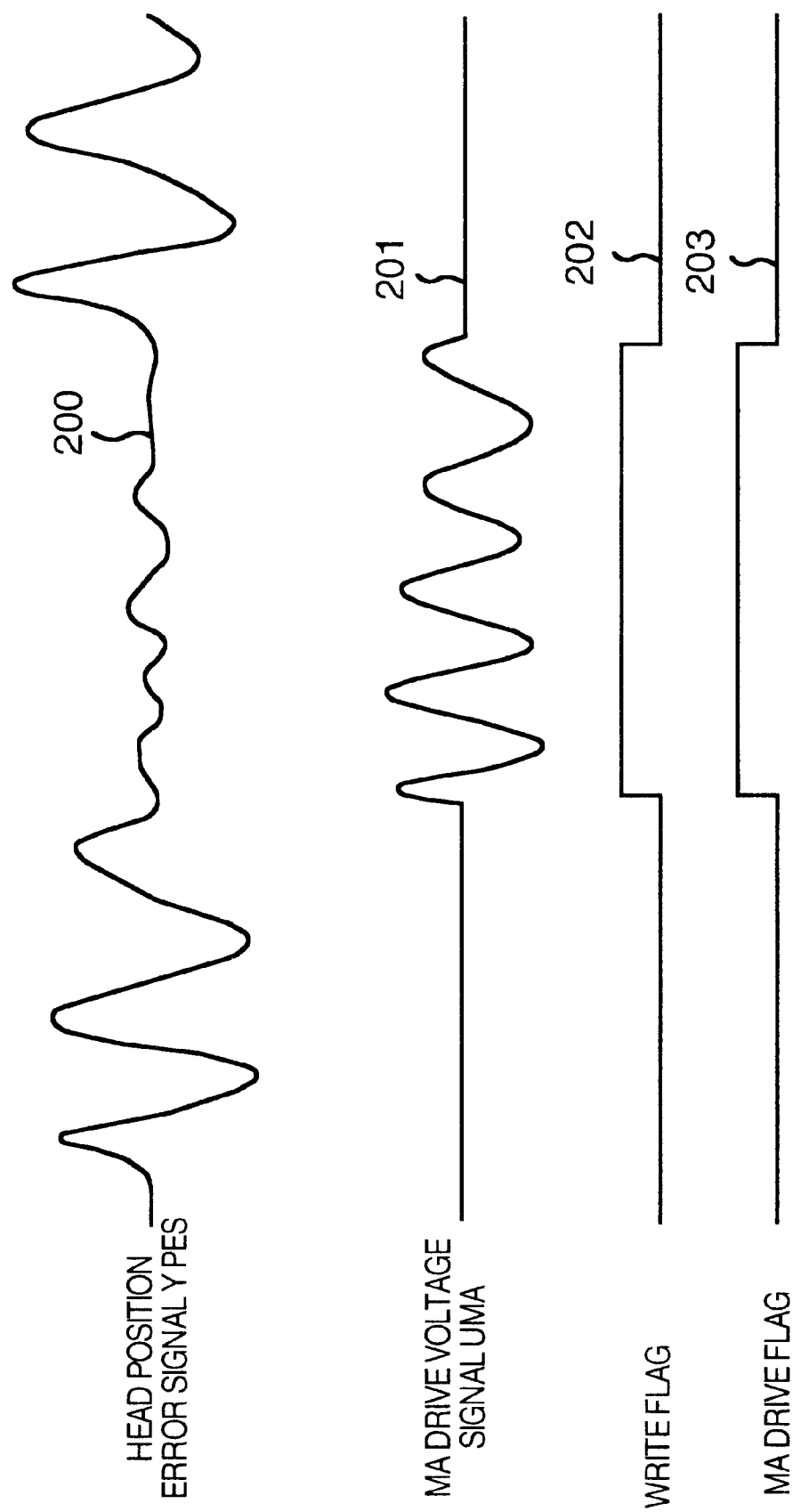
FIG. 4 is a response operation waveform diagram according to an embodiment of the invention.

FIG. 4 shows an example of response waveforms for the operation according to an embodiment of the invention. Apart from the description with reference to FIG. 3 that the operation of the micro actuator is stopped when the waiting mode continues for longer than a predetermined time, the micro actuator can be activated when reading or writing information from or into a target track in response to a read or write command. When reading or writing information from or into a target track, the head is required to be positioned in the target track with high accuracy, while the head is not rarely required to be positioned on a target track accurately in other cases. FIG. 4 shows, top down, a head position error signal 43, a MA drive voltage signal (output signal of the MA drive circuit 13), a write flag issued by the HDC 17 when writing data and a MA drive flag. Upon issuance of the write flag, the MA drive flag is also issued so that an output signal 50 of the MA controller 47 is sent out to the DAC thereby to start positioning the head 1. As a result, as long as the information is being written, the head position response signal 200 can be used to carry out the positioning operation with high accuracy. Although FIG. 4 shows the write operation as an example, a similar operation can be performed also for the read operation.

Figure 5:
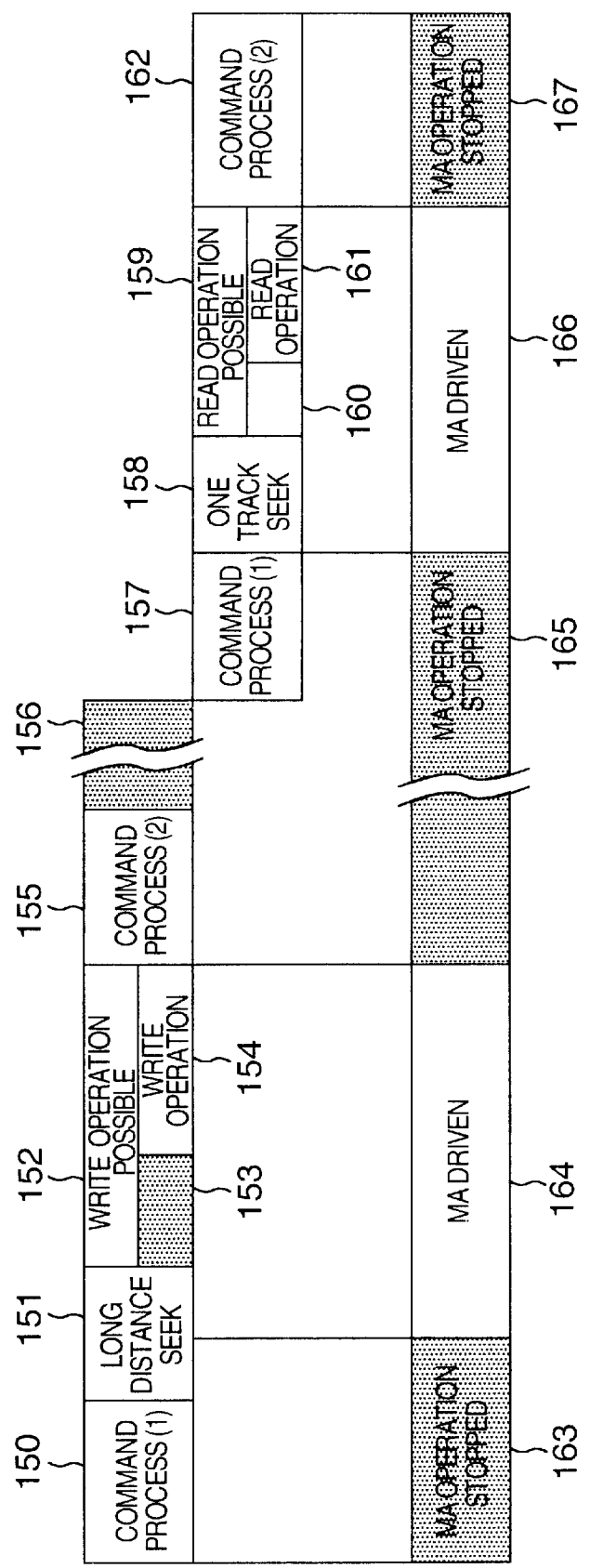
FIG. 5 is a diagram chronologically showing the process according to an embodiment of the invention.

The sequence of the R/W operation and the seek operation of the magnetic disk device and the sequence according to an embodiment of the invention will be explained with reference to FIG. 5. A command process (1) 150 is issued by the HDC 17 and includes the processing of the R/W request from the host system and the processing for issuance of the seek command. Then, the process proceeds to the seek operation. In the case where the distance covered is long, a long distance seek operation 151 is executed. With the arrival at a target track, a writable flag 152 is raised (which is assumed to be a write command in this case). The arrival of the head at a target sector is awaited (153), and when the head passes through the target sector, the write operation is executed (154). In the command process (2), a write end report is issued. In the process, the micro actuator (MA) is out of operation if the command process (1) is under execution (163). Once the long distance seek command is issued and the head arrives within the drive stroke of the micro actuator, the MA is started to operate and set in the target track quickly (164). Although a response waveform for activating the MA only during the write operation is shown in FIG. 4, the MA operation is carried out continuously until the write operation is complete without interrupting the MA operation after the seek operation. As a result, the write operation can be carried out accurately. In the case where one track seek command is issued for moving to the adjacent track in the command process (1) 157 (158), on the other hand, the MA begins to operate and moves the head while adjusting the operation thereof with the VCM.

Figure 6:
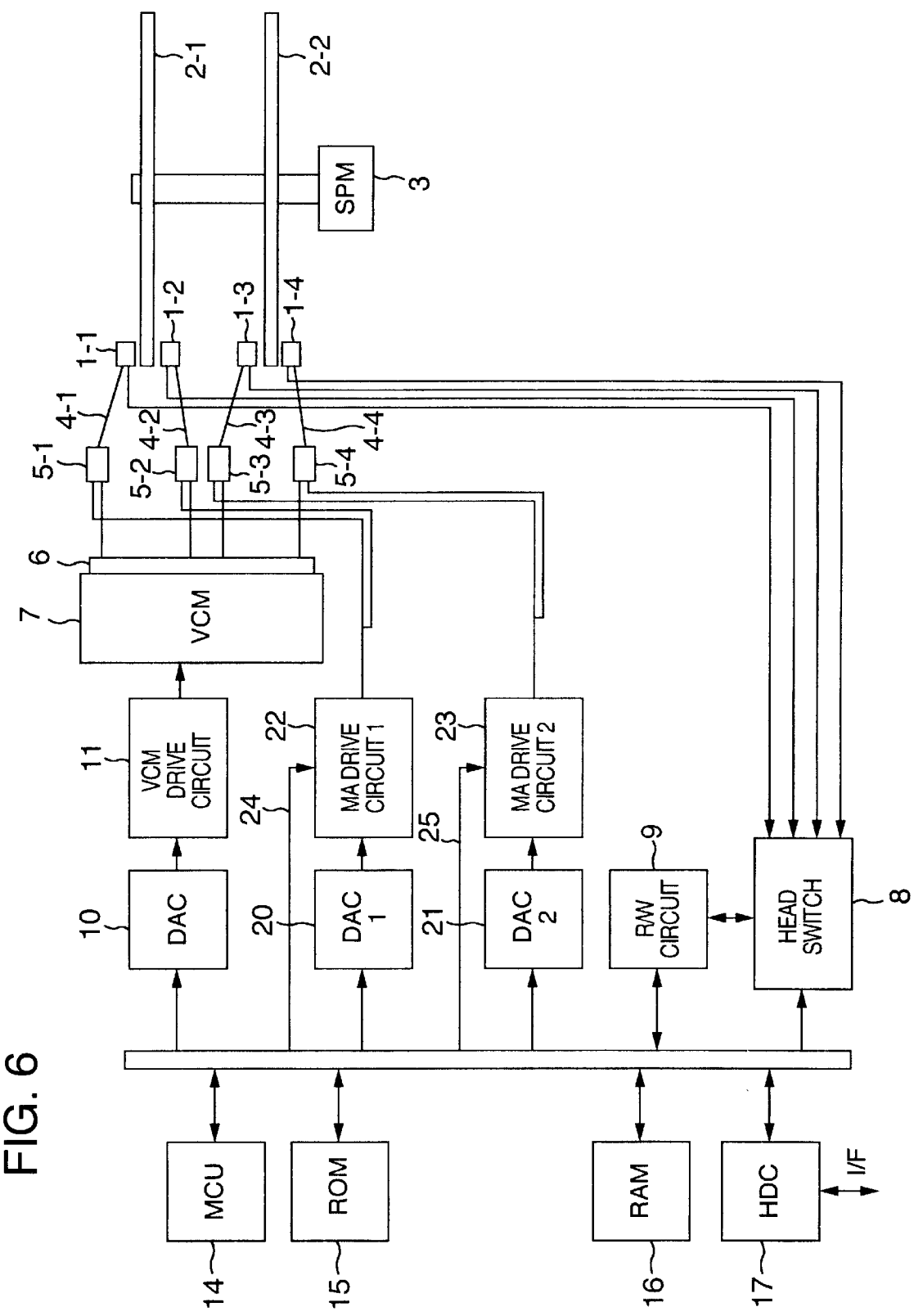
FIG. 6 is a diagram showing a hardware configuration according to an embodiment of the invention.

Now, assume that there are four micro actuators similar to the one shown in FIG. 6 and there are two MA drive circuits for driving the micro actuators. The micro actuators are divided into two groups. One group including the micro actuators 5-1, 5-2 may be driven by the MA drive circuit (1) 22, while the other group including the micro actuators 5-3, 5-4 may be driven by the MA drive circuit (2) 23. In such a case, while one of the groups is being driven, the drive circuit for the other group is stopped by stop signals 24, 25. Also, as described above, the output of the drive circuit may be reduced to zero or maintained at a constant value.

The foregoing description refers to a magnetic disk device. Nevertheless, the embodiments of the invention in which the operation of the micro actuator using a piezo actuator or the like is temporarily suspended for a predetermined length of time to improve the service life thereof are not limited to a magnetic disk device, but applicable with equal effect to an optical disk device, a stepper device, an oscillator damping device, etc.

Also, in spite of the foregoing description of the embodiments with numerical values, the present invention is not limited in any way by numerical values.

According to this invention, the service life of the micro actuator can be lengthened by reducing the operation time of the micro actuator as far as possible. Further, a magnetic disk device having a superior reliability can be provided.

What is claimed is:

1. A magnetic disk device comprising:

a disk having information;

a head for reading or writing information from or into said disk;

a micro actuator for supporting and positioning said head;

a coarse actuator for carrying said micro actuator and positioning said head;

a controller for controlling said micro actuator and said coarse actuator based on the servo information read by said head; and a host controller for issuing an information read command or an information write command;

wherein the positioning operation of said micro actuator is stopped in the case where said host controller determines that the operation wait mode prevails.

2. A magnetic disk device according to claim 1, wherein the positioning operation of said micro actuator is stopped by reducing the output of a micro actuator drive circuit for driving said micro actuator to zero.

3. A magnetic disk device according to claim 1, wherein the positioning operation of said micro actuator is stopped by suspending the operation of a micro actuator drive circuit for driving said micro actuator.

4. A magnetic disk device comprising:

a disk having information;

a head for reading or writing information from or into said disk;

a micro actuator for supporting and positioning said head;

a coarse actuator for carrying said micro actuator and positioning said head;

a controller for controlling said micro actuator and said coarse actuator based on the servo information ready said head; and a host controller for issuing an information read command or an information write command;

wherein the control band of a positioning controller included in said controller for controlling said micro actuator is reduced in the case where said host controller determines that the operation is in wait mode.

5. A magnetic disk device according to claim 4, wherein the operation is in wait mode in the case where a command for reading or writing the information from or into the disk is not issued by said host controller for at least a predetermined length of time.

6. A magnetic disk device according to claim 4, wherein the operation is in wait mode in the case where said head has completed the operation for reading or writing information from or into a predetermined track of the disk.

* * * * *